(No Model.) 3 Sheets—Sheet 2.
A. W. RINGLAND.
HEATER.
No. 569,473. Patented Oct. 13, 1896.
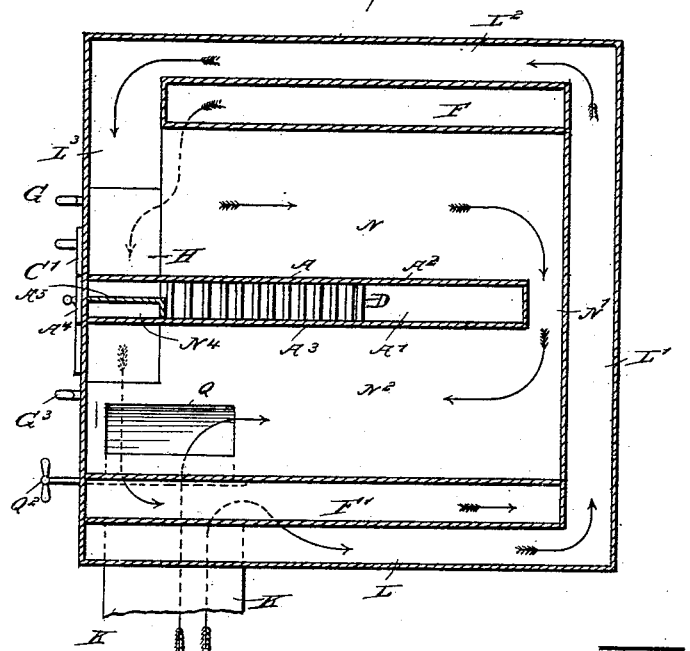
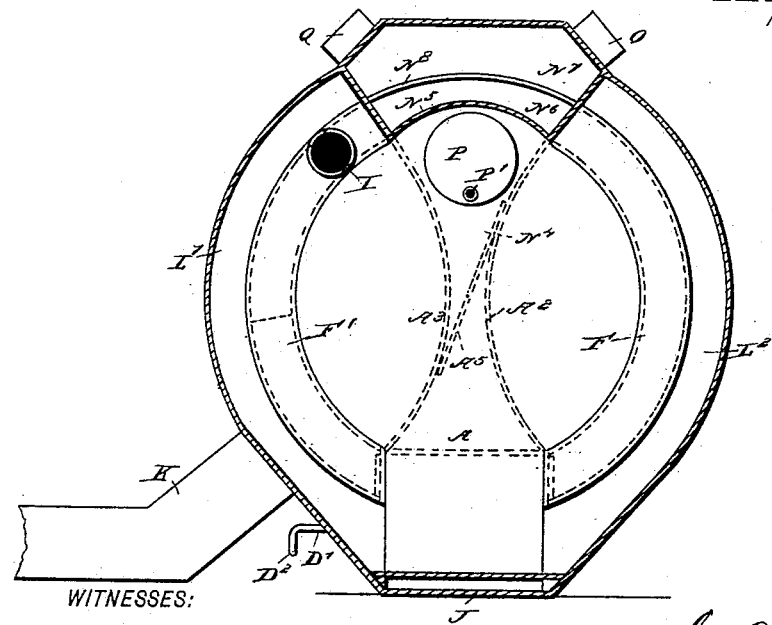
WITNESSES:
H. Walker
INVENTOR
A. W. Ringland
BY
Munn & Co.
ATTORNEYS.

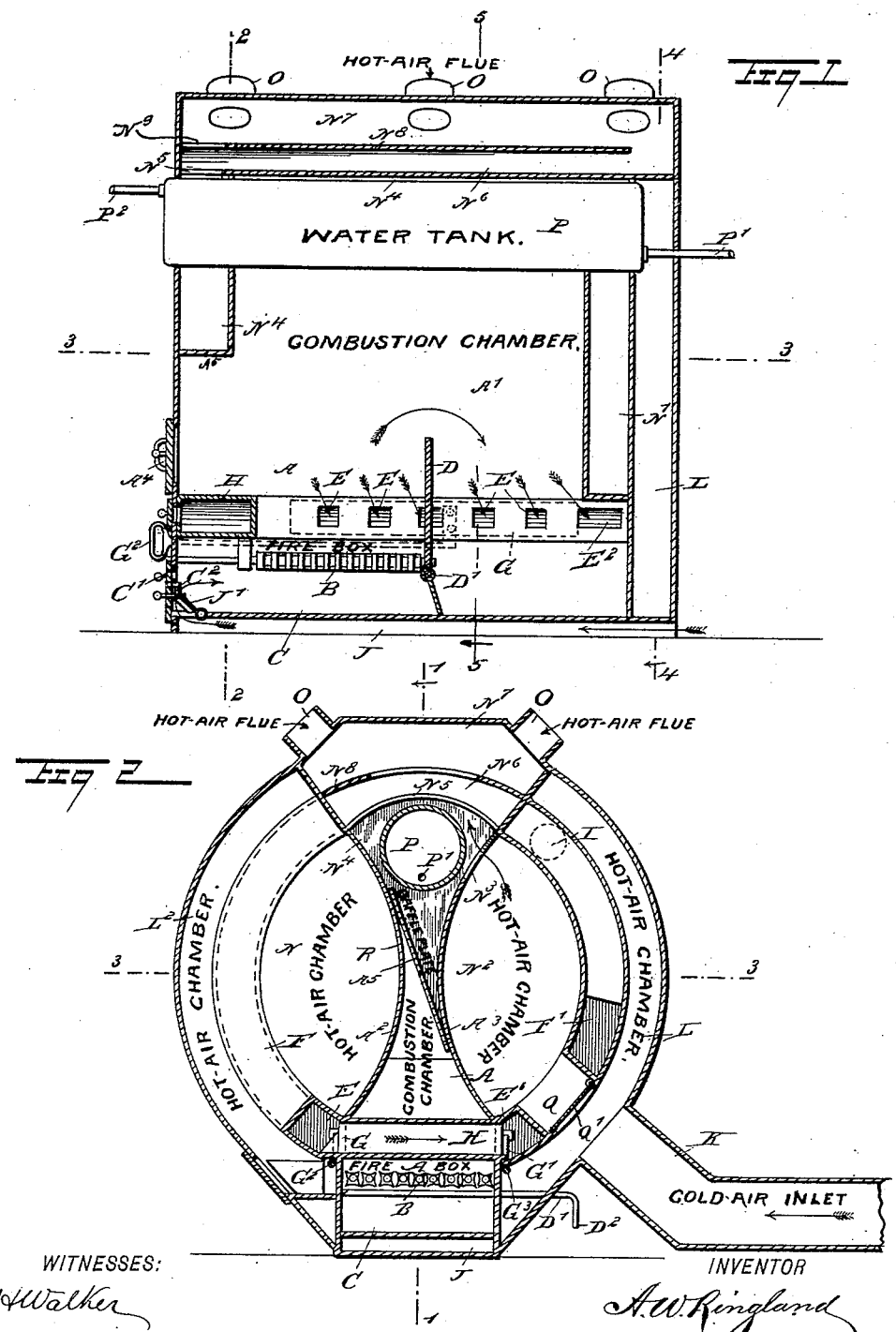

(No Model.) 3 Sheets—Sheet 3.
A. W. RINGLAND.
HEATER.
No. 569,473. Patented Oct. 13, 1896.
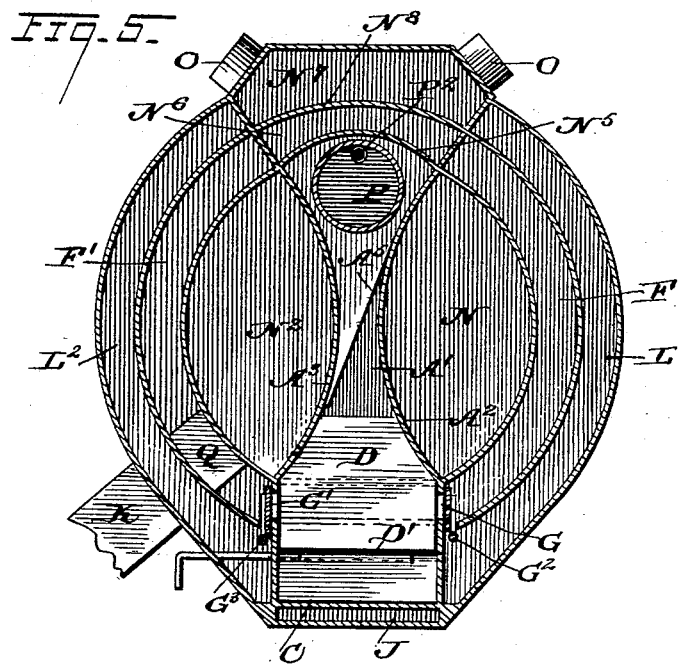
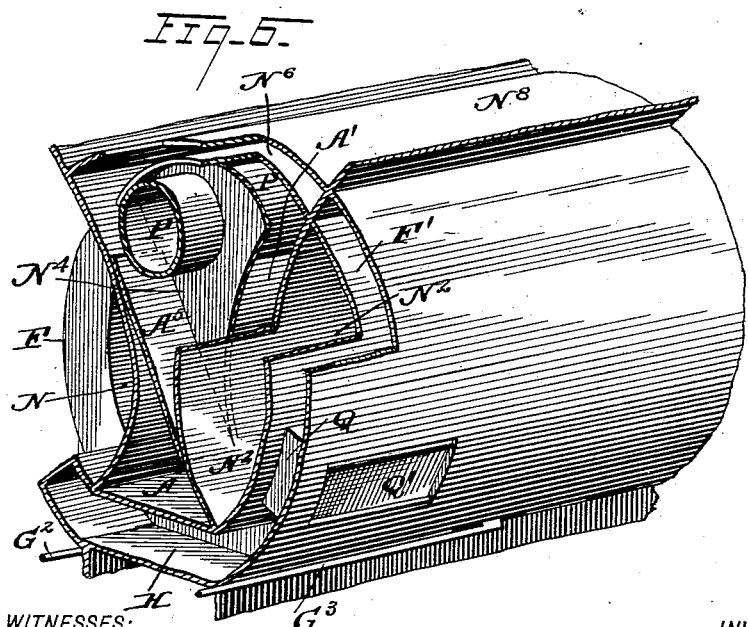
WITNESSES:
INVENTOR
A. W. Ringland
BY Munn & Co.
ATTORNEYS.

UNITED STATES PATENT OFFICE.

ADAM WEIR RINGLAND, OF TOLEDO, OHIO.

HEATER.

SPECIFICATION forming part of Letters Patent No. 569,473, dated October 13, 1896.

Application filed June 26, 1895. Serial No. 554,121. (No model.)

*To all whom it may concern:*

Be it known that I, ADAM WEIR RINGLAND, of Toledo, in the county of Lucas and State of Ohio, have invented a new and Improved Heater, of which the following is a full, clear, and exact description.

The invention relates to hot-air furnaces; and its object is to provide a new and improved heater which is simple and durable in construction, very effective in operation, and arranged to utilize the fuel to the fullest advantage.

The invention consists principally in a fire-box having a combustion-chamber extending the length of the heater and formed with side walls curved inward or toward each other, so that their convex sides are contiguous.

The invention further consists of an exterior hot-air-circulating chamber, an interior hot-air chamber separated from the said exterior chamber, and an inlet-flue leading into the said exterior hot-air chamber and having a valved connection with the said interior hot-air chamber.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a sectional side elevation of the improvement on the line 1 1 of Fig. 2. Fig. 2 is a transverse section of the same on the line 2 2 of Fig. 1. Fig. 3 is a sectional plan view of the same on the lines 3 3 of Figs. 1 and 2, and Fig. 4 is a transverse section of the improvement on the line 4 4 of Fig. 1. Fig. 5 is a vertical section on line 5 5 of Fig. 1. Fig. 6 is a perspective view of the interior portion or body of the heater proper.

The improved heater is provided with a centrally-arranged fire-box A, formed with a combustion-chamber A', extending nearly the length of the heater and formed with side walls $A^2$ and $A^3$, curved toward each other, as plainly shown in the drawings. The combustion-chamber is provided in its forward part with a suitable door $A^4$, Fig. 1, and at the bottom with a grate B above the ash-pit C, provided at its front end with a suitable door C' for removing the ashes whenever required.

In the fire-box A and at the end of the grate B is arranged a transverse partition D, Figs. 1 and 5, extending up a short distance into the combustion-chamber A' and secured at its lower end on a shaft D', extending to the outside of the heater to carry at its outer end a handle $D^2$, (see Fig. 2,) to permit the operator to swing the said partition D downward into a horizontal position or upward into a vertical position to prevent the fuel burning on the grate B from falling into the soot-pit at the rear end of the combustion-chamber A'. There are two opposite segmental side chambers F and F', Figs. 2 and 5, between whose inner sides and the concave sides of the combustion-chamber A' are two oval longitudinal hot-air chambers N $N^2$. Communication is established between the said segmental chambers F and F' and the central chamber A' by means of openings E E', Figs. 1 and 2, formed in the sides of said chamber A' near its bottom. These openings are provided with slides or valves G and G', respectively, which are operated, *i. e.*, slid longitudinally by means of rods $G^2$ and $G^3$, (see Figs. 1 and 6,) that extend through the front of the heater. By sliding these valves G G' either or both of the openings E E' may be wholly or partly opened or closed, as required for controlling the direction of the products of combustion through the heater.

The forward end of the chamber F is connected by a cross-flue H with the forward end of the other chamber, F', and this cross-flue is arranged in front of the fire-box proper directly above the ash-pit, as indicated in Fig. 1. An escape-flue I, Fig. 4, for the products of combustion is provided at the rear end of the right-hand segmental chamber F'.

Now it will be seen that when the valve G' is closed and the valve G is opened, then the smoke and gases pass through the side openings E into the chamber F to travel forwardly thereof and pass through the front cross-flue H into the front end of the other chamber, F', to then travel rearwardly therein, and finally pass into the chimney-flue I, leading from the rear end of the chamber F'. If, on the other hand, the valve G is closed and the valve G' is opened, the smoke and gases from the fire-box A can pass directly from the opening E' into the chamber F' and from the latter directly to the chimney-flue I.

Warm air is furnished for the burning fuel on the grate to aid combustion, and for this purpose I provide an air-flue J, Fig. 1, under the fire-box A and the ash-pit C, the said air-flue J being provided at its front end and on the top with a gate J', adapted to be opened by a projection $C^2$, extending from the inside of the ash-pit door C'. Now when the latter is closed the projection $C^2$ swings the gate or door J' open to permit the air entering the flue J at the rear of the heater to travel under the fire-box and ash-pit to be thus heated before this air passes into the ash-pit and to the grate B and the fuel burning thereon. The ash-pit door C' is provided with the usual damper or valve to permit cold air to pass directly into the ash-pit and to the burning fuel.

A cold-air duct K, Fig. 2, for furnishing the cold air to be heated opens into an exterior hot-air chamber L, arranged on the outside of the chamber F' and connected at its rear end by a cross-chamber L' with a second exterior hot-air chamber, $L^2$, arranged on the opposite side of the said chamber L. The front end of this exterior hot-air chamber $L^2$ is connected by a cross-flue $L^3$ with the front end of an interior hot-air chamber N, arranged longitudinally between the inner wall of the chamber F and the side $A^2$ of the combustion-chamber A', as will be readily understood by reference to Figs. 2 and 3. The rear end of this interior hot-air chamber N is connected at the end of the fire-box A by a cross-flue N' with a second interior hot-air chamber, $N^2$, extending longitudinally between the inner wall of the chamber F' and the side $A^3$ of the combustion-chamber A'.

The front end of the hot-air chamber $N^2$ is connected by openings $N^3$, Fig. 2, with a small central hot-air chamber $N^4$, formed in the front end of the combustion-chamber by an inclined baffle-plate $A^5$, connecting the sides $A^2$ and $A^3$ with each other. The top of this chamber $N^4$ connects by an opening $N^5$ with a dome $N^7$, from which lead the distributing-flues O for carrying the hot air to the various rooms of the building. The dome $N^7$ is provided with a horizontally and transversely extending partition or baffle-plate $N^8$, having an opening $N^9$ at the front end above the opening $N^5$ and extending to within a short distance of the rear end of the heater. This partition $N^8$ forms a flue $N^6$ for carrying part of the hot air coming up through the opening $N^5$ to the rear end of the dome $N^7$ to supply the rear delivery-pipes O with a full quota of hot air.

A short flue Q connects the exterior chamber L with the interior hot-air chamber $N^2$, directly opposite the entrance of the duct K, and this flue Q contains a damper or valve Q', provided with a handle $Q^2$, extending to the front of the heater to be under the control of the operator, so that the latter can open the said damper to permit the cold air coming in at the duct K to pass directly through the said flue Q into the hot-air chamber $N^2$ whenever it is desired.

In the upper portion of the combustion-chamber A' is arranged a longitudinally-extending closed water-tank P, which also passes through the chamber $N^4$, and is provided with an inlet-pipe P' and with an outlet-pipe $P^2$, of which the former enters the tank at the rear and the outlet-pipe $P^2$ extends from the front end of the said tank. It will be seen that the smoke and gases rising in the combustion-chamber pass around the tank P, so as to heat the water contained in the tank.

It will be seen that by the entire arrangement described the smoke and gases can be passed directly to the chimney-flue, or indirectly, as desired, and in a like manner the air entering the heater at the duct K can be directly passed through the heater when the valve Q' is opened, or indirectly through the several chambers, as before mentioned. Thus any desired degree of temperature can be given to the air before letting the same pass by the distributing-flues O into the several rooms of the building. It will also be seen that by the air for aiding the combustion of the fuel on the grate-bars the said fuel is completely consumed and the heat generated is utilized to the fullest advantage for heating the circulating air.

The inwardly-curved walls $A^2 A^3$ present a larger radiating-surface than straight ones and allow larger air-spaces, and, by reason of their divergence at the base, a large grate may be used in a comparatively small combustion-chamber. The inward curve forces the products of combustion to impinge on the walls and also aids the draft.

Having thus fully described my invention, I claim as new and desire to secure by Letters Patent—

1. A heater, comprising a combustion-chamber having its opposite side walls curved inwardly, whereby convex surfaces are presented to the products of combustion, a grate arranged in the base of said chamber, and hot-air chambers on opposite sides of the combustion-chamber, and air inlets and outlets for both air and products of combustion, substantially as shown and described.

2. A heater, comprising a combustion-chamber having opposite, inwardly-curved side walls, and a grate located at its base, segmental hot-air chambers on opposite sides of said combustion-chamber, and chambers F and F' arranged exteriorly to the hot-air chambers, and having valved openings in their lower portion, for communicating with the combustion-chamber, substantially as shown and described.

3. A heater, comprising a fire-box having a combustion-chamber, side chambers having valved communications with the said combustion-chamber, one of the side chambers leading to the chimney-flue, and a cross-flue connecting the two chambers with each other at the end opposite to where the chimney-flue is located, substantially as shown and described.

4. A heater, comprising a fire-box having a combustion-chamber, side chambers extending from the sides of the said combustion-chamber, valves for controlling the communications between the said fire-box and the said side chambers, and a cross-flue for connecting the free ends of the said side chambers with each other, substantially as shown and described.

5. A heater, comprising two exterior hot-air-circulating chambers connected with each other at their rear ends, interior hot-air chambers connected with each other at their rear ends, and one being connected at its front end with one of the said exterior hot-air chambers, and a central hot-air chamber connected with the other hot-air chamber and outlet-openings, substantially as shown and described.

6. A heater, comprising two exterior hot-air-circulating chambers connected with each other at their rear ends, interior hot-air chambers connected with each other at their rear ends, and one being connected at its front end with one of the exterior hot-air chambers, a central hot-air chamber connected with the other hot-air chamber, and a flue provided with a valve for connecting the two adjacent exterior and interior chambers with each other directly opposite the air-duct and outlet-openings, substantially as shown and described.

7. A heater, comprising two exterior hot-air-circulating chambers connected with each other at their rear ends, interior hot-air chambers connected with each other at their rear ends, and one being connected at its front end with one of the said exterior hot-air chambers, a central hot-air chamber connected with the other interior hot-air chamber, and a distributing-dome connected with the said central hot-air chamber, substantially as shown and described.

8. A heater, comprising two exterior hot-air-circulating chambers connected with each other at their rear ends, interior hot-air chambers connected with each other at their rear ends, and one being connected at its front end with one of the said exterior hot-air chambers, a central hot-air chamber connected with the other interior hot-air chamber, a distributing-dome connected with the said central hot-air chamber, and a partition or baffle-plate in the said dome, to deliver part of the hot air rising from the said central hot-air chamber to the rear part of the dome and the rear distributing-pipes, substantially as shown and described.

9. A heater, comprising a fire-box formed with a combustion-chamber, side chambers having valved connections with the said combustion-chamber, one of the chambers being connected with the chimney-flue, a cross-flue for connecting the front ends of the said side chambers with each other, exterior hot-air-circulating chambers connected with each other at their rear ends and arranged on the outside of the said chambers, and interior hot-air chambers connected with each other at their rear ends and located between the said side chambers and the combustion-chamber and outlet-openings, substantially as shown and described.

10. A heater, comprising a fire-box having a combustion-chamber, side chambers having valved communications with the said combustion-chamber, one of the chambers being connected with the chimney-flue, a cross-flue for connecting the front ends of the said side chambers with each other, interior hot-air-circulating chambers having air-inlets and connected with each other at their rear ends and located between the said side chambers and the combustion-chamber, a central hot-air chamber connected with one end of the said interior hot-air chambers, and a distributing-dome connected with the said central hot-air chamber, substantially as shown and described.

11. A heater comprising a fire-box, provided with a combustion-chamber, side chambers having valved connections with the said combustion-chamber, one of the chambers being connected with the chimney-flue, a cross-flue for connecting the front ends of the said side chambers with each other, interior hot-air-circulating chambers having air-inlets and connected with each other at their rear ends and located between the said side chambers and the combustion-chamber, a central hot-air chamber connected with one of the said interior hot-air chambers, a distributing-dome connected at its rear end with the said central hot-air chamber, and a water-tank arranged in the said combustion-chamber, substantially as shown and described.

ADAM WEIR RINGLAND.

Witnesses:
JOHN M. ORMOND,
JAMES YORK, Jr.